(12) United States Patent
Yamaya et al.

(10) Patent No.: US 7,270,887 B2
(45) Date of Patent: Sep. 18, 2007

(54) ANTIREFLECTIVE COATING, COATING COMPOSITION, AND ANTIREFLECTIVE COATED ARTICLE

(75) Inventors: Masaaki Yamaya, Usui-gun (JP); Kazuharu Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 29 days.

(21) Appl. No.: 11/244,154

(22) Filed: Oct. 6, 2005

(65) Prior Publication Data

US 2006/0078717 A1 Apr. 13, 2006

(30) Foreign Application Priority Data

Oct. 13, 2004 (JP) ............................. 2004-298523

(51) Int. Cl.
*C08G 77/24* (2006.01)
(52) U.S. Cl. .......................... 428/447; 528/34; 528/35; 528/36; 106/287.13
(58) Field of Classification Search ................ 428/447; 528/34, 35, 36; 106/287.13
See application file for complete search history.

(56) References Cited

U.S. PATENT DOCUMENTS 5,314,731 A 5/1994 Yoneda et al.
5,464,704 A * 11/1995 Yoneda et al. ............... 428/429
5,645,939 A * 7/1997 Yoneda et al. ............... 428/429
2004/0209084 A1 10/2004 Yamaya et al.

FOREIGN PATENT DOCUMENTS

| JP | 61-40845 | 2/1986 |
|---|---|---|
| JP | 6-29332 | 4/1994 |
| JP | 2629813 | 4/1997 |
| JP | 3210045 | 7/2001 |
| JP | 2002-53805 | 2/2002 |
| JP | 2004-315712 | 11/2004 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

An antireflective coating having improved alkali resistance is formed on a transparent substrate of synthetic resin as an outermost layer and has a three-dimensional crosslinked structure containing F and Si atoms. The crosslinked structure is composed of Si—O—Si and Si—$C_2H_4$—$(CF_2)_n$—$C_2H_4$—Si linkages wherein n is 4 or 6; the molar ratio of F atoms to Si atoms is from 8.0 to 10.0; and perfluoroalkyl groups account for 90 to 100 mol % of all monovalent organic substituent groups attached to silicon atoms. The antireflective coating can exhibit such alkali resistance that when a droplet of a 1 wt % NaOH aqueous solution is rested on the antireflective coating for 30 minutes and then wiped off, the appearance of the coating is kept unchanged from the initial appearance.

12 Claims, No Drawings

ANTIREFLECTIVE COATING, COATING COMPOSITION, AND ANTIREFLECTIVE COATED ARTICLE

CROSS-REFERENCE TO RELATED APPLICATION

This non-provisional application claims priority under 35 U.S.C. §119(a) on Patent Application No. 2004-298523 filed in Japan on Oct. 13, 2004, the entire contents of which are hereby incorporated by reference.

TECHNICAL FIELD

This invention relates to an antireflective coating of fluorinated silicone with a specific crosslinked structure having improved alkali resistance, mar resistance and anti-staining properties, a coating composition for forming the antireflective coating comprising primarily a (partial) hydrolyzate of a fluorine-containing bis-silane compound and a perfluoroalkylsilane, and a coated optical article comprising a cured coating of the composition.

BACKGROUND ART

In many optical articles including various displays such as computer displays, TV and plasma displays, liquid crystal display devices, transparent plastic lenses, covers in various instruments, and window panes in automobiles and trains, antireflective coatings are often used as an outermost layer for the purpose of improving visibility. The principle of antireflection requires that the antireflective coating have a low refractive index.

Fluoroplastics are employed in the antireflection application as in displays because they essentially have a low refractive index and satisfactory alkali resistance. However, since the fluoroplastics are often used as rubber due to their molecular structure, it is difficult to form hard protective coatings having mar resistance from such fluoroplastics.

Recently, hydrolyzable silane compounds having perfluoroalkyl groups were developed. To take advantage of their favorable characteristics, a variety of coating compositions comprising hydrolyzable silane compounds have been developed for imparting alkali resistance, water repellency, oil repellency, anti-staining and anti-reflection. However, since perfluoroalkyl groups contributing to these favorable characteristics are bulky and inert, the cured coatings have a low crosslink density. As a result, the cured coatings are fairly hard as compared with fluoroplastics, but still lack mar resistance.

Several systems were developed for enhanced mar resistance. For example, JP-A 2002-53805 describes co-hydrolysis of a perfluoroalkyl-containing silane and a silane compound such as a tetraalkoxysilane; JP-A 61-40845 and JP-B 6-29332 describe systems using a bis-silane compound having perfluoroalkylene as a spacer in combination with a perfluoroalkyl-containing silane and a tetraalkoxysilane or silane coupling agent for imparting both mar resistance and anti-staining properties. The system using tetraalkoxysilane is undesirable in that the Q unit moiety is so weak to alkali that the coatings can be deteriorated when they are washed with strong alkaline detergents for household use. Also, Japanese Patent No. 2,629,813 describes a system comprising a bis-silane compound having perfluoroalkylene as a spacer and an epoxy-functional silane. This system achieves fairly satisfactory levels of desired properties such as anti-staining, mar resistance, adhesion and antireflection. However, it lacks alkali resistance because of a reduced fluorine content and the hydrophilicity of epoxy groups. This is problematic on practical use.

In one example described in the above Japanese Patent No. 2,629,813, a combination of a bis-silane compound having perfluoroalkylene as a spacer and a perfluoroalkyl-containing silane is applied to a transparent plastic substrate having a scattering irregular surface. The perfluoroalkylene group of the bis-silane compound used therein has a long chain length, which suggests a long distance between crosslinking sites in the resulting cured coating with the accompanying drawback of failing to provide sufficient mar resistance. No reference is made to alkali resistance. The essential characteristics to meet satisfactory alkali resistance were then not acknowledged. Japanese Patent No. 3,210,045 describes a similar system in which alkali resistance on hard glass substrates is evaluated. Examples use a test of evaluating alkali resistance by immersing a sample wholly in a 1% NaOH aqueous solution for 24 hours, washing the sample immediately thereafter, and inspecting the sample for outer appearance change and water droplet removal. The coats examined therein include two types of coats, a coat of perfluoroalkyl-containing silane alone and a coat of a ternary system comprising a bis-silane compound having perfluoroalkylene as a spacer, a perfluoroalkyl-containing silane, and a tetraalkoxysilane. The present inventor performed evaluation by another test of placing a droplet of alkaline solution on a coat, wiping off the droplet after 30 minutes, and visually inspecting for any outer appearance change. In the ternary system coat, the area where a droplet had been rested became slightly white hazed and was distinguishable in outer appearance from the colorless transparent area where no droplet was rested, indicating insufficient alkali resistance. The test of immersing a sample wholly in an alkaline solution is an insufficient evaluation in that since the entire sample is uniformly deteriorated, any change of outer appearance is not easily perceivable. Many of the samples which are evaluated as passing the whole immersion test seem to have insufficient alkali resistance on practical use. The coat of perfluoroalkyl-containing silane alone, when applied to synthetic resin substrates, is less resistant to marring as mentioned above. As discussed above, none of the known systems have recognized the requirements to meet all of alkali resistance, mar resistance and anti-staining properties that the present inventor has found.

There are available no antireflective coating compositions that possess multiple functions of chemical resistance (inter alia, alkali resistance), mar resistance, and anti-staining.

DISCLOSURE OF THE INVENTION

An object of the present invention is to provide an antireflective coating with a three-dimensional crosslinked structure containing F and Si atoms and having improved alkali resistance, mar resistance and anti-staining properties, a coating composition for forming the antireflective coating, an optical article having an antireflective coating formed thereon, and a multilayer laminate comprising the optical article.

Seeking for an antireflective coating having improved alkali resistance and mar resistance, the inventors have found that all alkali resistance, mar resistance and anti-staining properties are simultaneously met by an antireflective coating satisfying the features described below, a coating composition for forming the antireflective coating, and an optical article coated with a cured coating of the composition.

The inventors have found that an antireflective coating which is formed on a transparent substrate of synthetic resin as an outermost layer and which has a three-dimensional crosslinked structure containing fluorine and silicon atoms exhibits satisfactory alkali resistance, mar resistance and anti-staining properties when (I) the crosslinked structure is composed solely of Si—O—Si linkages and Si—C$_2$H$_4$—(CF$_2$)$_n$—C$_2$H$_4$—Si linkages (wherein n is equal to 4 or 6) containing fluorine atoms and having a short chain spacer, whereby the crosslink density is increased to provide satisfactory mar resistance, (II) the molar ratio of fluorine atoms to silicon atoms (F/Si) in the antireflective coating is from 8.0 to 10.0, and (III) perfluoroalkyl groups having the structure:

—C$_2$H$_4$—(CF$_2$)$_a$F wherein a is equal to 4, 6, 8, 10 or 12 account for 90 to 100 mol % of all monovalent organic substituent groups attached to silicon atoms, whereby the cured coating is endowed with water repellency, oil repellency and lubricating properties. The combined effects of features (I), (II) and (III) ensure that the antireflective coating can exhibit such alkali resistance that when a droplet of a 1 wt % NaOH aqueous solution is rested on the antireflective coating for 30 minutes and then wiped off, the appearance of the coating is kept unchanged from the initial appearance.

Since the coat resulting from the inventive composition has a low refractive index, the coat alone or in combination with a high refractive index under-layer having an optical thickness offers a coat having improved antireflection.

By virtue of the substantial absence of Q units which are weak to attacks by alkali substances, the construction of a network from siloxane linkages and short-chain rigid fluorinated alkylene groups, which offers an increased crosslink density, and the inclusion of F atoms at or above a specific ratio, the coat exhibits high alkali resistance. When stains on the surface are to be washed away, even strongly alkaline detergents can be used without special care.

By reducing the length of fluorinated alkylene chain to increase the crosslink density and incorporating fluorine atoms at or above a certain ratio, the coat is endowed on its surface with lubricity, thus exhibiting satisfactory mar resistance and anti-staining properties.

As mentioned above, the cured coat is also effective as a protective coat on plastic substrates that lack such properties. Since the cured coat is improved in transparency as well, it is applicable as antireflective optical articles or films having water repellency, anti-staining, anti-fingerprinting and mar resistance, for example, in displays such as computer displays, TV and plasma displays, polarizers in liquid crystal displays, transparent plastic lenses, covers in various instruments, and window panes in automobiles and trains. When the coat is provided on the back side with a layer of adhesive or pressure-sensitive adhesive, the antireflective film or plate can be bonded to any support prior to use. The present invention is predicated on these findings.

It is noted that the inventor proposed in JP-A 2004-315712 or US 2004-0209084 a protective coat-forming coating composition having improved chemical resistance, primarily comprising a bis-silane compound containing a perfluoroalkylene group as a spacer. As household detergents are improved in performance, the required level of alkali resistance rises progressively. There is thus a need for an antireflective coating composition having higher alkali resistance. The present invention meets this and other needs.

In one aspect, the invention provides an antireflective coating having improved alkali resistance which is formed on a transparent substrate of synthetic resin as an outermost layer and which has a three-dimensional crosslinked structure containing fluorine and silicon atoms. The antireflective coating should satisfy the following features (I) to (III).

(I) The crosslinked structure is composed of Si—O—Si linkages and Si—C$_2$H$_4$—(CF$_2$)$_n$—C$_2$H$_4$—Si linkages wherein n is equal to 4 or 6.

(II) A molar ratio of fluorine atoms to silicon atoms in the antireflective coating is from 8.0 to 10.0.

(III) Perfluoroalkyl groups having the structure:

—C$_2$H$_4$—(CF$_2$)$_a$F wherein a is equal to 4, 6, 8, 10 or 12 account for 90 to 100 mol % of all monovalent organic substituent groups attached to silicon atoms.

In preferred embodiments, the antireflective coating contains a single end-capped diorganopolysiloxane chain; the antireflective coating contains only 0 to less than 1 mol % based on the entire silicon atoms of SiZ$_4$ units wherein Z is an OH group, alkoxy group of 1 to 4 carbon atoms, acyloxy group, alkenoxy group or siloxane residue.

In another aspect, the invention provides a coating composition for forming an antireflective coating having improved alkali resistance, comprising primarily a mixture of (1) a bis-silane compound having the formula (A):

$$X_mR_{3-m}Si—C_2H_4(CF_2)_nC_2H_4—SiR_{3-m}X_m \quad (A)$$

wherein R which may be the same or different is a monovalent hydrocarbon group selected from alkyl groups of 1 to 6 carbon atoms and phenyl groups, X is an OH group, halogen atom, alkoxy group of 1 to 4 carbon atoms, acyloxy group, alkenoxy group, ketoxime group, alkoxyalkoxy group or —NCO group, m is 2 or 3, and n is 4 or 6, and/or a (partial) hydrolyzate and/or condensate thereof, and (2) a perfluoroalkyl-containing organosilicon compound having the formula (B):

$$F(CF_2)_aC_2H_4—SiR_{3-b}X_b \quad (B)$$

wherein R and X are as defined above, a is 4, 6, 8, 10 or 12, and b is 2 or 3, and/or a (partial) hydrolyzate and/or condensate thereof, or a (partial) cohydrolytic condensate of a mixture of components (1) and (2), wherein the content of component (2) is 42 to 70% by weight based on the total weight of components (1) and (2).

In one preferred embodiment, the coating composition further includes a silicon or fluorine-containing surfactant.

The coating composition may further include (3) an organosilicon compound having the average compositional formula (C):

$$[R_3Si—(O—R_2Si—)_c—Y—]_pR_qSiX_rO_{(4-p-q-r)/2} \quad (C)$$

wherein R and X are as defined above, Y is —O— or an alkylene group of 2 to 10 carbon atoms, p, q, and r are numbers satisfying $0.01 \leq p<1$, $0 \leq q<1$, $0.5 \leq r<3$, $1<p+q+r<4$, and c is a number of 1 to 100.

Preferably, the mixture of organosilicon compounds (1) and (2) or the (partial) cohydrolytic condensate thereof contains only less than 1% by weight of an alkyl silicate, epoxy-functional silane, (meth)acrylic-functional silane, mercapto-functional silane, amino-functional silane and (partial) hydrolyzates thereof.

Typically the coating composition contains 50 to 99% by weight based on the composition of a solvent.

In a further aspect, the invention provides a coated optical article comprising a transparent substrate of synthetic resin and a cured coating of the coating composition formed on the substrate as an outermost layer, said cured coating serving as an antireflective coating. The coated optical article may further include a coating having a higher refractive index than the substrate and/or a protective layer having mar resistance disposed between the transparent substrate and the antireflective coating. Often the coating having a higher refractive index comprises a metal oxide sol containing at least one element selected from Ti, Sn, Ce, Al, Zr, In, and Fe. The synthetic resin is typically selected from among polycarbonate resins, polyalkylene terephthalate resins, acrylic resins, triacetyl cellulose resins, polystyrene resins, and polyolefin resins. The transparent substrate is typically in the form of film or plate.

In a still further aspect, the invention provides a multi-layer laminate comprising the coated optical article, a layer of adhesive or pressure-sensitive adhesive disposed on the side of the transparent substrate remote from the antireflective coating, and a peelable coating disposed thereon.

Advantages of the antireflective coating and the article having the antireflective coating on its surface are that they exhibit improved alkali resistance, mar resistance, and anti-staining properties. The coating composition of the invention is effectively used to form the antireflective coating.

DESCRIPTION OF THE PREFERRED EMBODIMENTS

The antireflective coating of the invention is formed on a transparent substrate of synthetic resin as an outermost layer and has a three-dimensional crosslinked structure containing fluorine and silicon atoms. The antireflective coating is characterized in that (I) the crosslinked structure is composed of Si—O—Si linkages and Si—$C_2H_4$—$(CF_2)_n$—$C_2H_4$—Si linkages wherein n is equal to 4 or 6, (II) the antireflective coating contains fluorine atoms and silicon atoms in a molar ratio F/Si between 8.0 and 10.0, and (III) perfluoroalkyl groups having the structure:

—$C_2H_4$—$(CF_2)_aF$ wherein a is equal to 4, 6, 8, 10 or 12 account for 90 to 100 mol % of all monovalent organic substituent groups attached to silicon atoms.

The antireflective coating has an excellent alkali resistance. Especially, the inventive antireflective coating can exhibit such alkali resistance that when a droplet of a 1 wt % NaOH aqueous solution is rested on the antireflective coating for 30 minutes and then wiped off, the appearance of the coating is kept unchanged from the initial appearance.

The crosslinked structure is composed of Si—O—Si linkages and Si—$C_2H_4$—$(CF_2)_n$—$C_2H_4$—Si linkages wherein n is equal to 4 or 6. The spacer portion (—$C_2H_4$—$(CF_2)_n$—$C_2H_4$—) may be either —$C_2H_4$—$(CF_2)_4$—$C_2H_4$— or —$C_2H_4$—$(CF_2)_6$—$C_2H_4$—. The reason is that as the chain length becomes longer, the crosslink density becomes sparse and as a result, the coating loses sufficient strength and hence, satisfactory mar resistance. Also, if a fluorinated polyether chain is used, the spacer portion ceases to be rigid, rather having negative impact on mar resistance.

The antireflective coating contains fluorine atoms and silicon atoms in a molar ratio F/Si between 8.0 and 10.0, preferably between 8.0 and 9.8. A molar ratio below this range corresponds to too low a fluorine content, which fails to establish alkali resistance. A molar ratio beyond this range indicates that the fluorine-containing organic substituent group or spacer portion becomes longer, and as a result, the cured coating becomes soft, failing to establish alkali resistance.

Perfluoroalkyl groups having the structure:

—$C_2H_4$—$(CF_2)_aF$ wherein a is equal to 4, 6, 8, 10 or 12 should account for 90 to 100 mol % of all monovalent organic substituent groups attached to silicon atoms, because the cured coating is endowed with good water repellency and lubricity, which ensure good alkali resistance, mar resistance and anti-staining properties. If the perfluoroalkyl content is below the lower limit, alkali resistance becomes short. The value of a that dictates the chain length of perfluoroalkyl group may fall in the range of 4 to 12. If the value of a is smaller than this range, sufficient water repellency is not available and satisfactory alkali resistance is not achievable. In the event the chain length is longer than this range, the cured coating becomes soft, failing to establish mar resistance. Additionally, the silane compound has an outstandingly elevated boiling point which imposes the difficulty of purification and an economical disadvantage. Organic substituent groups attached to silicon atoms other than the perfluoroalkyl groups include alkyl groups of 1 to 20 carbon atoms, phenyl groups and perfluoropolyether groups.

As long as the above features are met, the antireflective coating exhibits satisfactory alkali resistance when an alkali resistance test to be described below is performed. When a droplet of a 1 wt % NaOH aqueous solution is rested on the antireflective coating, held for 30 minutes and then wiped off, the appearance of the coating is kept unchanged from the initial appearance, i.e., does not develop pale white spots. As long as the requirements of F/Si ratio and fluorinated substituent group content are met, the antireflective coating has a refractive index of up to 1.40 enough to provide satisfactory antireflection performance.

In one preferred embodiment, a single end-capped diorganopolysiloxane chain-containing component is added to the antireflective coating. Then the siloxane chain portion lacking compatibility migrates to the surface prior to curing and is fixed thereat during curing, imparting good lubricity and anti-staining properties to the cured coating. As a result, the antireflective coating is improved in mar resistance and anti-staining properties.

If the antireflective coating contains Q units ($SiZ_4$ units), satisfactory alkali resistance is unachievable because the Q units are sensitive to alkali ingredients. For this reason, the content of Q units should preferably be minimized, with the substantial absence being more preferred. The content of Q units, if any, should preferably be limited to the range of 0 to less than 1 mol % based on the entire silicon atoms. It is noted that in $SiZ_4$ units, Z is an OH group, alkoxy group of 1 to 4 carbon atoms, acyloxy group, alkenoxy group or siloxane residue. By the siloxane residue is meant an end of a crosslinked structure linked via siloxane bonds.

Also provided is a coating composition for forming the antireflective coating described above. This coating composition is defined as comprising primarily a mixture of (1) a bis-silane compound having the formula (A):

$$X_mR_{3-m}Si-C_2H_4(CF_2)_nC_2H_4-SiR_{3-m}X_m \quad (A)$$

wherein R which may be the same or different is a monovalent hydrocarbon group selected from alkyl groups of 1 to 6 carbon atoms and phenyl groups, X is an OH group, halogen atom, alkoxy group of 1 to 4 carbon atoms, acyloxy group, alkenoxy group, ketoxime group, alkoxyalkoxy group or —NCO group, m is 2 or 3, and n is 4 or 6, and/or a (partial) hydrolyzate and/or condensate thereof, and (2) a perfluoroalkyl-containing organosilicon compound having the formula (B):

$$F(CF_2)_aC_2H_4\text{—}SiR_{3-b}X_b \quad (B)$$

wherein R and X are as defined above, a is 4, 6, 8, 10 or 12, and b is 2 or 3, and/or a (partial) hydrolyzate and/or condensate thereof, or a (partial) cohydrolytic condensate of a mixture of components (1) and (2). The content of component (2) is 42 to 70% by weight based on the total weight of components (1) and (2).

Component (1) is a bis-silane compound having the formula (A).

$$X_mR_{3-m}Si\text{—}C_2H_4(CF_2)_nC_2H_4\text{—}SiR_{3-m}X_m \quad (A)$$

Herein R which may be the same or different is a monovalent hydrocarbon group selected from alkyl groups of 1 to 6 carbon atoms and phenyl groups. Examples include methyl, ethyl, propyl, butyl, hexyl, cyclohexyl and phenyl groups. X is an OH group, halogen atom, alkoxy group of 1 to 4 carbon atoms, acyloxy group, alkenoxy group, ketoxime group, alkoxyalkoxy group or —NCO group. Examples include OH groups, halogen atoms such as Cl, alkoxy groups such as methoxy, ethoxy, propoxy, isopropoxy and butoxy, alkenoxy groups such as isopropenoxy, acyloxy groups such as acetoxy, ketoxime groups such as methyl ethyl ketoxime, alkoxyalkoxy groups such as methoxyethoxy, and —NCO groups. Methoxy and ethoxy groups are preferred because silane compounds having such groups are easy to handle and to control the reaction during hydrolysis. The subscript m representing the number of siloxane crosslinkable groups X is equal to 2 or 3. For increasing the crosslink density to achieve a satisfactory level of mar resistance, m=3 is preferred.

Illustrative examples of the bis-silane compound meeting the above requirements include $(CH_3O)_3Si\text{—}C_2H_4\text{—}(CF_2)_4\text{—}C_2H_4\text{—}Si(OCH_3)_3$,
$(CH_3O)_3Si\text{—}C_2H_4\text{—}(CF2)_6\text{—}C_2H_4\text{—}Si(OCH_3)_3$,
$(C_2H_5O)_3Si\text{—}C_2H_4\text{—}(CF2)_4\text{—}C_2H_4\text{—}Si(OC_2H_5)_3$,
$(C_2H_5O)_3Si\text{—}C_2H_4\text{—}(CF2)_6\text{—}C_2H_4\text{—}Si(OC_2H_5)_3$,
$(C_3H_7O)_3Si\text{—}C_2H_4\text{—}(CF2)_4\text{—}C_2H_4\text{—}Si(OC_3H_7)_3$,
$(C_3H_7O)_3Si\text{—}C_2H_4\text{—}(CF2)_6\text{—}C_2H_4\text{—}Si(OC_3H_7)_3$,
$(CH_3O)_2(CH_3)Si\text{—}C_2H_4\text{—}(CF_2)_4\text{—}C_2H_4\text{—}Si(CH_3)(OCH_3)_2$,
$(CH_3O)_2(CH_3)Si\text{—}C_2H_4\text{—}(CF_2)_6\text{—}C_2H_4\text{—}Si(CH_3)(OCH_3)_2$,
$(CH_3O)_2(C_6H_5)_3Si\text{—}C_2H_4\text{—}(CF_2)_4\text{—}C_2H_4\text{—}Si(C_6H_5)(OCH_3)_2$,
$(CH_3O)_2(C_6H_5)Si\text{—}C_2H_4\text{—}(CF_2)_6\text{—}C_2H_4\text{—}Si(C_6H_5)(OCH_3)_2$, etc.

Of these, $(CH_3O)_3Si\text{—}C_2H_4\text{—}(CF_2)_4\text{—}C_2H_4\text{—}Si(OCH_3)_3$ and $(CH_3O)_3Si\text{—}C_2H_4\text{—}(CF_2)_6\text{—}C_2H_4\text{—}Si(OCH_3)_3$ are preferred bis-silane compounds used herein.

Also, partial hydrolyzates of these bis-silane compounds and condensates thereof may be employed.

Component (2) to be used along with the bis-silane compound (A) is a perfluoroalkyl-containing organosilicon compound having the formula (B).

$$F(CF_2)_aC_2H_4\text{—}SiR_{3-b}X_b \quad (B)$$

Herein R and X are as defined above. The subscript a that determines the chain length of perfluoroalkyl group should have a value of 4, 6, 8, 10 or 12. A shorter chain is not preferable because a lower content of fluorine atoms in the coating detracts from alkali resistance. The subscript b representing the number of siloxane crosslinkable groups X should be equal to 2 or 3. For increasing the crosslink density to achieve a satisfactory level of mar resistance, b=3 is preferred.

Examples of the fluorinated organic substituent group-containing organosilicon compound meeting the above requirements include $CF_3(CF_2)_3C_2H_4\text{—}Si(OCH_3)_3$,
$CF_3(CF_2)_3C_2H_4\text{—}Si(OC_2H_5)_3$,
$CF_3(CF_2)_3C_2H_4\text{—}Si(CH_3)(OCH_3)_2$,
$CF_3(CF_2)_5C_2H_4\text{—}Si(OCH_3)_3$,
$CF_3(CF_2)_7C_2H_4\text{—}Si(OCH_3)_3$,
$CF_3(CF_2)_7C_2H_4\text{—}Si(OC_2H_5)_3$,
$CF_3(CF_2)_7C_2H_4\text{—}Si(CH_3)(OCH_3)_2$,
$CF_3(CF_2)_9C_2H_4\text{—}Si(OCH_3)_3$,
$CF_3(CF_2)_{11}C_2H_4\text{—}Si(OCH_3)_3$, etc.

Of these, $CF_3(CF_2)_7C_2H_4\text{—}Si(OCH_3)_3$ is most preferred.

Also, (partial) hydrolyzates of these organosilicon compounds and (partial) condensates thereof may be employed.

In the composition, the content of component (2) should be 42 to 70% by weight based on the total weight of components (1) and (2). With a component (2) content of less than 42 wt %, the cured coating has a lower fluorine content and hence, insufficient alkali resistance in many cases. With a component (2) content of more than 70 wt %, the cured coating may have a lower crosslink density, failing to achieve satisfactory mar resistance. The preferred content of component (2) is 43 to 60% by weight.

Other than the bis-silane compound and perfluoroalkyl-containing organosilicon compound described above, another compound may be used in combination therewith insofar as it does not compromise the desired properties. Illustrative examples of such additional compounds include silicates such as tetraethoxysilane; epoxy-functional silanes such as γ-glycidoxypropyltrimethoxysilane and 3,4-epoxycyclohexyltrimethoxysilane;

amino-functional silanes such as γ-aminopropyltriethoxysilane;

(meth)acrylic-functional silanes such as γ-(meth)acryloxypropyltrimethoxysilane;

mercapto-functional silanes such as γ-mercaptopropyltrimethoxysilane;

alkylsilanes such as methyltrimethoxysilane, hexyltrimethoxysilane, and decyltrimethoxysilane; phenylsilanes such as phenyltrimethoxysilane; and derivatives thereof. The content of these additional compounds is limited more or less. The alkyl silicate should not be included in an amount of 1% by weight or more based on the total organosilicon compounds. The content of hydrophilic silane compounds including epoxy-functional silanes, (meth)acrylic-functional silanes, mercapto-functional silanes, and amino-functional silanes is preferably up to 10% by weight, more preferably up to 1% by weight based on the total organosilicon compounds. It is not recommended to use more amounts of hydrophilic silane compounds because the resulting coatings become more wettable with water-soluble alkaline substances and more susceptible to alkaline attacks and undergo deterioration. The amount of the alkylsilanes and phenylsilanes may vary widely without problems as long as the foregoing requirements including F/Si ratio are met.

The bis-silane compound (A) and perfluoroalkyl-containing organosilicon compound (B) described above may be used as a simple mixture thereof, or in the form of (partial) hydrolyzates or in the form of (partial) hydrolytic condensates in solvents to be described below. From the standpoint of accelerating the cure rate after application, it is preferred that they be used in the form of (partial) hydrolytic condensates.

In these preferred embodiments, (partial) hydrolyzates or hydrolytic condensates of the respective compounds (A) and (B) may be used in admixture. Alternatively, a (partial) cohydrolytic condensate of a mixture of the compounds (A) and (B) may be used.

The amount of water used in hydrolysis is preferably determined such that a molar ratio of H$_2$O/Si—X may fall in the range between 0.1 and 10.

Hydrolysis and condensation may be performed by prior art well-known methods. Catalysts for hydrolysis or hydrolytic condensation include acids such as hydrochloric acid, nitric acid, acetic acid, and maleic acid; bases such as NaOH, amine compounds such as ammonia, triethylamine, dibutylamine, hexylamine, octylamine, and dibutylamine and salts of amine compounds, and quaternary ammonium salts such as benzyltriethylammonium chloride and tetramethylammonium hydroxide; fluoride salts such as potassium fluoride and sodium fluoride; solid acidic catalysts and solid basic catalysts such as ion-exchange resin catalysts; organometallic compounds, for example, metal salts of
  organic carboxylic acids such as iron 2-ethylhexoate,
titanium naphthenate, zinc stearate, and dibutyltin diacetate,
  organic titanium esters such as tetrabutoxytitanium,
tetra-i-propoxytitanium,
dibutoxy-(bis-2,4-pentanedionate)titanium,
and di-i-propoxy(bis-2,4-pentanedionate)titanium,
organic zirconium esters such as tetrabutoxyzirconium,
tetra-i-propoxyzirconium,
dibutoxy-(bis-2,4-pentanedionate)zirconium, and
di-i-propoxy(bis-2,4-pentanedionate)zirconium,
alkoxyaluminum compounds such as aluminum triisopropoxide,
and aluminum chelate compounds such as
aluminum acetylacetonate complex; and aminoalkyl-substituted alkoxysilanes such as γ-aminopropyltrimethoxysilane,
γ-aminopropyltriethoxysilane,
N-(β-aminoethyl)-γ-aminopropyltrimethoxylsilane, and
N-(β-aminoethyl)-γ-aminopropyltriethoxylsilane. These catalysts may be used alone or in admixture.

An appropriate amount of the catalyst added is 0.01 to 10 parts by weight, preferably 0.1 to 5 parts by weight per 100 parts by weight of the compound (A) or (B). With less than 0.01 parts of the catalyst, it may take too long a time until the reaction is completed, or the reaction may not take place. More than 10 parts of the catalyst is uneconomical, may cause the composition or cured product to be colored, and may induce more side reactions.

On use, the composition may be diluted. Suitable solvents used to this end include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate; ethers such as dioxane and tetrahydrofuran; ketones such as acetone, methyl ethyl ketone, methyl isobutyl ketone, cyclohexanone and acetylacetone; esters such as ethyl acetate, butyl acetate and ethyl acetoacetate; xylene and toluene.

The solvent may be added in any desired amount. For ease of application, ease of control of a coating thickness, and the stability of a coating liquid, the content of the solvent in a coating liquid is preferably 50 to 99% by weight, more preferably 70 to 98% by weight.

To the coating composition of the invention, silicon or fluorine-containing surfactants may be added. Examples include polyether-modified silicone compounds, and various fluorochemical surfactants as commercially available from Sumitomo 3M Co., Ltd. (trade name Fluorad), Dupont (fluoroalkylpolyether) and Asahi Glass Co., Ltd. (trade name Surflon). The surfactant may be added in an amount of 0.01 to 10% by weight based on solids in the coating composition. The surfactant is effective for the composition to maintain leveling during application.

In a preferred embodiment, a single end-capped polydialkylsiloxane chain-containing organosilicon compound is added to the coating composition. This organosilicon compound has the average compositional formula (C).

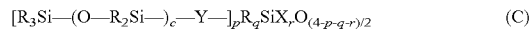

(C)

Herein R and X are as defined above, Y is —O— or an alkylene group of 2 to 10 carbon atoms, p, q, and r are numbers satisfying $0.01 \leq p < 1$, $0 \leq q < 1$, $0.5 \leq r < 3$, $1 < p+q+r < 4$, and c is a number of 1 to 100.

The organosilicon compound (C) is not fully compatible with the fluorine-rich main component of the coating composition. As a result, when the solvent volatilizes off from the coating composition, the organosilicon compound (C) undergoes phase separation and bleeds out at the surface, is secured to the cured surface because of the inclusion of reactive silyl group at one end, and thus imparts durable leveling, anti-staining or lubricating properties. In formula (C), Y stands for a spacer group for linking a single end-capped diorganopolysiloxane group to an oligomeric organosilicon compound having a hydrolyzable group. Examples of Y include ether oxygen (in this case, indicating a siloxane bond), —(CH$_2$)$_2$—, —(CH$_2$)$_6$—, —(CH$_2$)$_8$—, —(CH$_2$)$_{10}$—, —(CH$_2$)$_2$—C$_6$H$_4$—(CH$_2$)$_2$—, —(CH$_2$)$_2$—C$_6$H$_{10}$—, etc. Because of an economic advantage, ether oxygen or —(CH$_2$)$_2$— is preferred. Particularly when light resistance is required, preference is given to ether oxygen indicating that all basic skeleton is formed of siloxane bonds.

The subscript p representative of the degree of substitution of single end-capped diorganopolysiloxane groups is a number within the range: $0.01 \leq p < 1$. With p of less than 0.01, sufficient lubricating and anti-staining properties may not be obtained. With p of equal to or more than 1, cure properties may become short. The preferred range of p is $0.02 \leq p \leq 0.7$.

The subscript q representative of the degree of substitution of substituent groups R is a number within the range: $0 \leq q < 1$. A value of q equal to or more than 1 corresponds to a reduced number of crosslinkable groups X within the coating, which may lead to poor durability. The preferred range of q is $0 \leq q \leq 0.7$.

The subscript r representative of the degree of substitution of OH groups or hydrolyzable groups is a number within the range: $0.5 \leq r < 3$. A value of r less than 0.5 corresponds to a reduced number of crosslinkable groups X within the coating, which may lead to poor durability. A value of r equal to or more than 3 indicates a monomeric organosilicon compound in a substantial sense and may fail to provide satisfactory anti-staining properties because single end-capped diorganopolysiloxane groups are not effectively oriented outward on the treated surface. The preferred range of r is $1 \leq r \leq 2.5$.

The sum of p+q+r is in the range: $1<p+q+r<4$, preferably $2<p+q+r \leq 3$, more preferably $2.1 \leq p+q+r \leq 2.7$.

The subscript c representative of the degree of polymerization of diorganosiloxy units is a number within the range of 1 to 100. A value of c less than 1 corresponds to a short diorganosiloxane chain, failing to provide sufficient anti-staining properties. With c in excess of 100, orientation on the surface during treatment does not take place smoothly, failing to provide sufficient anti-staining properties, and surface fixation is not sufficient, leading to a loss of durability. The preferred range of c is from 1 to 50.

The organosilicon compound of formula (C) may be added in an amount of 0.01 to 10% by weight based on solids in the coating composition.

Further, in the coating composition of the invention, finely divided inorganic oxides, especially silica dispersed in an organic solvent or hollow silica sol may be included for the purpose of improving the hardness and mar resistance of a coating. Such fine particles should preferably have an average primary particle size of 0.001 to 0.1 µm, more preferably 0.001 to 0.08 µm. An average primary particle size in excess of 0.1 µm has a tendency that a cured coating of a composition containing such particles becomes less transparent. The finely divided inorganic oxides may be used after surface treatment with silane coupling agents or titanium, aluminum or zirconium coupling agents in the form of organometallic compounds. An appropriate amount of finely divided inorganic oxide added is 0 to 30 parts by weight, preferably 0.1 to 10 parts by weight of solids per 100 parts by weight of the total of components (1) and (2).

In the coating composition of the invention prepared by the above-described method, other optional components may be included, for example, organic or inorganic UV-absorbers, and buffer agents for controlling the pH of the system to a level of pH 2 to 7 at which silanol groups remain stable, such as acetic acid/sodium acetate and disodium hydrogen phosphate/citric acid.

The coating composition of the invention is applied to one surface of a substrate to form an antireflective coating thereon. It is usually recommended to control the thickness of the antireflective coating to 0.01 to 0.5 µm. In particular, adjustment to an optical coating thickness of the order of 0.1 µm ensures good antireflection. The method of applying the coating composition of the invention to the substrate surface is not particularly limited. Any of dipping, spin coating, flow coating, roll coating, spraying, screen printing and other coating techniques may be used. Because of ease of control of a coating thickness, a dipping, spraying or roll coating technique is preferably employed to apply the composition to a predetermined thickness.

When the coating composition of the invention is cured, suitable heat curing conditions include a temperature of room temperature to 150° C. and a time of 1 minute to 10 hours, more preferably a temperature of 60° C. to 120° C. and a time of 10 minutes to 2 hours.

The coating composition of the invention is applied to a transparent substrate of synthetic resin. The invention is applicable to all synthetic resins as long as they have satisfactory optical properties. Examples of suitable synthetic resin include, but are not limited to, polycarbonate resins, polyalkylene terephthalate resins such as PET, cellulose resins such as diacetyl cellulose, acetate butyrate cellulose, and triacetyl cellulose, acrylic resins, polystyrene resins, polyimide resins, polyester resins, polyether sulfone resins, liquid crystalline resins such as polyarylate, polyurethane resins, polysulfone resins, polyether ketone resins, polyolefin resins such as trimethylpentene and polyvinyl norbornene, and composite resins thereof. Most preferred are polycarbonate resins, polyalkylene terephthalate resins such as PET, triacetyl cellulose resins, and acrylic resins. The transparent substrate may be any of molded parts, plates and film. For ease of coating operation, a film form is more preferred.

On the cured coating formed on the substrate surface from the coating composition of the invention, any oil repellent, anti-staining coating may be laid. The provision of an oil repellent, anti-staining coating is preferred particularly for preventing oily stains such as fingerprints from being adhered when the antireflective article of the invention is used and for allowing such stains, if adhered, to be readily removed.

When the transparent substrate coated with the coating composition of the invention is used as an antireflective part having improved mar resistance and chemical resistance, it may be attached to another transparent support prior to use. For attachment to the other support, an adhesive may be applied to the side of the substrate remote from the side coated with the coating composition of the invention. Suitable adhesives include prior art well known acrylic, epoxy, polyimide and silicone base adhesives and pressure-sensitive adhesives. Inter alia, acrylic and silicone base adhesives are preferred. The thickness of the adhesive layer may be in a range of 1 to 500 µm. Too thin an adhesive layer may fail to provide a satisfactory bonding force whereas too thick an adhesive layer may be uneconomical. On the adhesive layer, a protective plastic sheet as a peelable coating may be laid for surface protection.

Also provided by the present invention is a coated optical article wherein a cured coating of the coating composition is formed on a transparent substrate of synthetic resin as an outermost layer as mentioned above. The cured coating serves as an antireflective coating. In a preferred embodiment, a coating having a higher refractive index than the substrate and/or a protective layer having mar resistance is disposed between the transparent substrate and the antireflective coating.

Reference is first made to the high refractive index layer which is disposed between the transparent substrate and the antireflective coating for the purpose of enhancing antireflection. It is required that the high refractive index layer have a high hardness and as high a refractive index as possible. The inventors have discovered it advantageous that the high refractive index layer be given a refractive index of at least 1.60 by compounding a metal oxide sol having a high refractive index in a composition of which the high refractive index layer is formed. The metal oxide sol to be compounded for increasing a refractive index is preferably composed of ultra-fine particles having a high refractive index of at least 1.6. The high refractive index metal oxide sol preferably has an average particle size of 1 to 100 nm, more preferably 1 to 50 nm. When the high refractive index metal oxide sol is compounded in the high refractive index layer-forming composition, its amount is, though not particularly limited, 5 to 500 parts by weight per 100 parts by weight of curable ingredients in the high refractive index layer-forming composition for fully achieving its purpose. The more preferred amount is 70 to 250 parts by weight. More than 500 parts by weight of the metal oxide sol on this basis is not preferred because there often arise such problems as the occurrence of haze in the cured coating. Less than 5 parts by weight is ineffective for increasing the refractive index.

For the purpose of increasing the refractive index of the high refractive index cured layer, it is preferred that the high refractive index metal oxide sol have a refractive index which is higher than the refractive index of the cured layer and at least 1.6. To this end, a metal oxide sol containing at least an element selected from among Ti, Sn, Ce, Al, Zn, In and Fe is preferred. Examples include metal oxides such as ZnO (n=1.90), $TiO_2$ (n=2.3-2.7), $Sb_2O_5$ (n=1.71), $Y_2O_3$ (n=1.87), $La_2O_3$ (n=1.95), $ZrO_2$ (n=2.05), $Al_2O_3$ (n=1.63), and ITO (n=1.95) which is a mixed oxide of In and Sn. Also preferred is a high refractive index metal oxide sol in the form of a composite oxide containing such components.

Also useful are metal oxide sols of $In_2O_3$, $SnO_2$, $CeO_2$, $Fe_2O_3$ and the like. It is especially preferred to use a metal oxide sol containing titanium atoms capable of providing a higher refractive index. These high refractive index metal oxide sols may be surface modified with silane compounds or organic functional group-containing silane coupling agents, titanium coupling agents, organic functional group-containing acrylic polymers or the like, because dispersion stability is improved.

Examples of a dispersing medium in which the high refractive index metal oxide sol is dispersed include water, alcohols such as methanol and ethanol, esters such as ethyl acetate and butyl acetate, ethers such as propylene glycol monomethyl ether, and ketones such as methyl ethyl ketone and methyl isobutyl ketone.

As a curable resin of which the high refractive index cured layer is formed, any of prior art well-known thermoplastic resins and/or moisture-, heat- or photo-curable organic resins and silicone resins is applicable. Suitable moisture-, heat- or photo-curable organic resins include heat-curable acrylic resins, moisture-curable acrylic resins, thermoplastic acrylic resins, UV/EB-curable acrylic resins, silane or siloxane-modified acrylic resins, urethane resins, UV/EB-curable epoxy resins, thermosetting silicone resins, moisture-curable silicone resins, and UV/EB-curable silicone resins. Inter alia, silicone resins obtained through hydrolysis or further (partial) condensation of various hydrolyzable silane compounds are preferred because coatings thereof have a high hardness and fully adhesive to the antireflective coating of the invention. UV-curable acrylic resins, epoxy resins and silicone resins are also preferred because the adhesion and productivity of coatings thereof.

In systems where polymerization is induced by irradiating light/radiation such as UV and electron beams, it is preferred to add photo-polymerization initiators so that the systems undergo photo-polymerization. Suitable photo-polymerization initiators include aryl ketone photo-polymerization initiators (e.g., acetophenones, benzophenones, alkylaminobenzophenones, benzyls, benzoins, benzoin ethers, benzyl dimethyl ketals, benzoyl benzoates, and α-acyloxime esters), sulfur-containing photo-polymerization initiators (e.g., sulfides and thioxanthones), acylphosphine oxide photo-polymerization initiators and the like. Also the photo-polymerization initiators may be used in combination with photo-sensitizers such as amines. Illustrative examples of photo-polymerization initiators include 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methylpropan-1-one, 1-hydroxycyclohexyl phenyl ketone, 2-methyl-1-{4-(methylthio)phenyl}-2-morpholinopropan-1-one, benzyl, benzoin, benzoin methyl ether, benzoin ethyl ether, benzoin isopropyl ether, benzoin isobutyl ether, benzyl dimethyl ketal, benzophenone, benzoylbenzoic acid, methyl benzoylbenzoate, 4-phenylbenzophenone, hydroxybenzophenone, acrylic benzophenone, 3,3'-dimethyl-4-methoxybenzophenone, 3,3',4,4'-tetra(t-butylperoxycarbonyl)benzophenone, 9,10-phenanthrenequinone, camphorquinone, dibenzosuberone, 2-ethylantharaquinone, 4',4"-diethylisophthalophenone, α-acyloxime ester, methyl phenylglyoxylate, 4-benzoyl-4'-methyldiphenyl sulfide, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyl diphenylphosphine oxide, benzoyl diphenylphosphine oxide, 2,6-dimethylbenzoyl diphenylphosphine oxide, and bis(2,6-dimethoxybenzoyl)-2,4,4-trimethylpentylphosphine oxide.

The high refractive index curable composition may be diluted with a solvent prior to use. Suitable solvents used herein include methanol, ethanol, diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetoacetate, ethyl acetate, butyl acetate, xylene, and toluene.

If necessary, well-known additives which are used in conventional coating compositions, for example, leveling agents may be compounded.

The high refractive index layer thus formed has a thickness which is determined so as to maintain optical properties including antireflection, depending on its refractive index. Usually the layer has a thickness of 0.02 to 3 μm, preferably 0.05 to 0.5 μm.

Next, reference is made to the protective layer which may be disposed between the transparent substrate and the antireflective coating or between the transparent substrate and the high refractive index layer for imparting improved mar resistance. The protective layer must be fully adhesive to various transparent substrates of polycarbonate resins, polyalkylene terephthalate resins (e.g., PET), cellulose resins (e.g., triacetyl cellulose), and acrylic resins, and exhibit a satisfactory hardness when formed to or above a certain thickness. Thermoplastic acrylic resins, UV/EB-curable acrylic resins, epoxy resins or silicone resins having organic functional groups such as acrylic or epoxy groups may be used to form the protective layer. For ease of application, acrylic resins are preferred. Illustrative examples of the protective layer include (A) a layer obtained from a radiation-polymerizable composition, especially a composition comprising an organosilicon compound having (meth)acrylic functional groups by radiation-assisted polymerization for curing;

(B) a layer resulting from curing of a composition comprising an acrylic polymer, especially a composition comprising an acrylic polymer containing hydrolyzable silyl groups; and (C) a layer of an acrylic polymer, especially a thermoplastic acrylic resin having heat resistance and high hardness and comprising primarily methyl methacrylate as a copolymerized component.

Further, inorganic oxide fine particles may be incorporated into the protective layer for the purpose of adjusting the hardness, mar resistance, electric conduction and other physical properties thereof. Examples of inorganic oxide fine particles include silica, aluminum oxide, titanium oxide, zinc oxide, zirconium oxide, cerium oxide, tin oxide, indium oxide and composite oxides thereof. Inter alia, colloidal silica is most preferred. These inorganic oxide fine particles may be surface treated with silane coupling agents or titanium, aluminum or zirconium coupling agents in the form of organometallic compounds prior to use.

The amount of inorganic oxide fine particles added, when used, is 0.1 to 80 parts by weight, preferably 1 to 50 parts by weight of solids per 100 parts by weight of the acrylic polymer containing hydrolyzable silyl groups. More than 80 pbw of finely divided inorganic oxide tends to detract from the transparency of a cured coating formed of a composition comprising the same.

Ordinary UV absorbers may be added to the protective layer for the purpose of restraining the substrate from photo-degradation. Preferred UV absorbers include inorganic UV absorbers such as titanium oxide fine particles and zinc oxide fine particles and organic UV absorbers to be described below. The preferred organic UV absorbers are derivatives of compounds having a main skeleton of hydroxybenzophenone, benzotriazole, cyanoacrylate or triazine. Also useful are polymers, typically vinyl polymers, bearing these UV absorbers on side chain. Examples include 2,4'-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-butylphenyl)benzotriazole, 2-(2-hydroxy-5-t-octylphenyl)benzotriazole, 2-(2-hydroxy-3,5-di-t-butylphenyl)benzotriazole, ethyl 2-cyano-3,3-diphenylacrylate, 2-ethylhexyl 2-cyano-3,3-diphenylacrylate, 2-(2-hydroxy-4-hexyloxyphenyl)-4,6-diphenyltriazine, polymeric 4-(2-acryloxyethoxy)-2-hydroxybenzophenone, and polymeric 2-(2'-hydroxy-5'-methacryloxyethylphenyl)-2H-benzotriazole. These organic UV absorbers may be used in admixture of two or more.

The thickness of the protective layer is not particularly limited as long as the desired mar resistance is available. Usually, the protective layer has a thickness of 0.1 to 10 μm. Too thin a protective layer fails to provide satisfactory mar resistance whereas too thick a protective layer is likely to crack. The preferred thickness is in a range of 0.2 to 5 μm.

EXAMPLE

Synthesis Examples, Examples and Comparative Examples are given below for further illustrating the present invention although the invention is not limited thereto. In Examples, all % and parts are by weight. The average molecular weight is a number average molecular weight as determined by gel permeation chromatography (GPC) using polystyrene standards.

Synthesis Example 1

A 3-liter flask equipped with a stirrer, condenser and thermometer was charged with 49.8 g (0.10 mol) of bis-silane compound (A-1), 56.8 g (0.10 mol) of fluorine-containing silane (B-1), and 400 g of t-butanol. With stirring at 25° C., 18 g (1.0 mol) of 0.1N aqueous acetic acid was added dropwise over 10 minutes.

Stirring was continued at 25° C. for a further 48 hours, bringing hydrolysis to completion. To the system were added 1 g of aluminum acetylacetonate as a condensation catalyst, 1 g of fluorochemical surfactant Fluorad FC-4430 as a leveling agent, 1,700 g of ethanol, and 100 g of diacetone alcohol. The mixture was stirred for 30 minutes, obtaining an antireflective coating solution (I).

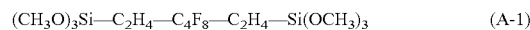
$(CH_3O)_3Si$—$C_2H_4$—$C_4F_8$—$C_2H_4$—$Si(OCH_3)_3$     (A-1)

$(CH_3O)_3Si$—$C_2H_4$—$C_8F_{17}$     (B-1)

Content of (B-1)=53 wt %, as computed according to $\{(B-1)/((A-1)+(B-1))\} \times 100$
F/Si=8.3 (molar ratio)

Si-bonded perfluoroalkyl groups/all Si-bonded monovalent organic substituent groups=100 mol %

Synthesis Example 2

An antireflective coating solution (II) was prepared as in Synthesis Example 1 except that 59.8 g (0.10 mol) of bis-silane compound (A-2) was used instead of the bis-silane compound (A-1), and the amount of fluorine-containing silane (B-1) was changed to 45.4 g (0.08 mol).

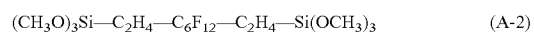
$(CH_3O)_3Si$—$C_2H_4$—$C_6F_{12}$—$C_2H_4$—$Si(OCH_3)_3$     (A-2)

Content of (B-1)=43 wt %

F/Si=9.1 (molar ratio)

Si-bonded perfluoroalkyl groups/all Si-bonded monovalent organic substituent groups=100 mol %

Synthesis Example 3

An antireflective coating solution (III) was prepared as in Synthesis Example 1 except that the amount of bis-silane compound (A-1) was changed to 39.8 g (0.08 mol), and the amount of fluorine-containing silane (B-1) was changed to 68.2 g (0.12 mol).

Content of (B-1)=63 wt %

F/Si=9.6 (molar ratio)

Si-bonded perfluoroalkyl groups/all Si-bonded monovalent organic substituent groups=100 mol %

Synthesis Example 4

An antireflective coating solution (IV) was prepared as in Synthesis Example 1 except that a mixture of 18.6 g (0.04 mol) of fluorine-containing silane (B-3) and 46.1 g (0.06 mol) of fluorine-containing silane (B-2) was used instead of the fluorine-containing silane (B-1).

$(CH_3O)_3Si$—$C_2H_4$—$C_{12}F_{25}$     (B-2)

$(CH_3O)_3Si$—$C_2H_4$—$C_4F_9$     (B-3)

Content of (B-2)+(B-3)=57 wt %

F/Si=8.9 (molar ratio)

Si-bonded perfluoroalkyl groups/all Si-bonded monovalent organic substituent groups=100 mol %

Synthesis Example 5

An antireflective coating solution (V) was prepared as in Synthesis Example 1 except that 1 g of a single end-capped diorganopolysiloxane chain-bearing compound (Si degree of polymerization=15), shown below, was added in addition to the silane compounds.

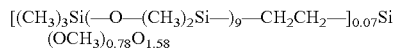

Synthesis Example 6 (Comparison)

An antireflective coating solution (VI) was prepared as in Synthesis Example 1 except that 4.2 g (0.02 mol) of tetraethoxysilane was added in addition to the silane compounds.

Synthesis Example 7 (Comparison)

An antireflective coating solution (VII) was prepared as in Synthesis Example 1 except that the amount of bis-silane compound (A-1) was changed to 79.7 g (0.16 mol), and the amount of fluorine-containing silane (B-1) was changed to 22.7 g (0.04 mol).
Content of (B-1)=22 wt %
F/Si=5.4 (molar ratio)

Si-bonded perfluoroalkyl groups/all Si-bonded monovalent organic substituent groups=100 mol %

Synthesis Example 8 (Comparison)

An antireflective coating solution (VIII) was prepared as in Synthesis Example 1 except that the amount of bis-silane compound (A-1) was changed to 19.9 g (0.04 mol), and the amount of fluorine-containing silane (B-1) was changed to 90.9 g (0.16 mol).
Content of (B-1)=82 wt %
F/Si=12.7 (molar ratio)

Si-bonded perfluoroalkyl groups/all Si-bonded monovalent organic substituent groups=100 mol %

Synthesis Example 9

A 2-liter flask equipped with a stirrer, condenser and thermometer was charged with 236.3 g (1.00 mol) of γ-glycidoxypropyltrimethoxysilane, 74.5 g (0.30 mol) of γ-glycidoxypropyldiethoxysilane, and 700 g of a sol of 30% particles having a primary particle size of 20 nm and consisting of TiO$_2$/ZrO$_2$/SiO$_2$ in a weight ratio of 85/3/12 dispersed in methanol. With stirring at room temperature, 70 g of 0.1N aqueous acetic acid was added dropwise over 1 hour. Stirring was continued at room temperature for a further 5 hours, bringing hydrolysis to completion. To the system were added 150 g of diacetone alcohol, 2 g of aluminum acetylacetonate as a condensation catalyst, and 2 g of polyether-modified silicone as a leveling agent. The mixture was stirred for 30 minutes, obtaining a silicone solution containing high refractive index sol. Ethanol, 600 g, was added to 100 g of the silicone solution, yielding a high refractive index layer-forming coating composition (K) of the heat cure type.

Synthesis Example 10

A 1-liter flask equipped with a stirrer, condenser and thermometer was charged with 82.0 g (0.35 mol) of γ-acryloxypropyltrimethoxysilane, 32.7 g (0.15 mol) of γ-acryloxypropylmethyldimethoxysilane, 104.2 g (0.50 mol) of tetraethoxysilane, and 50 g of isobutanol. With stirring at 10° C., 65 g of 0.1N aqueous acetic acid was added dropwise over 1 hour. Stirring was continued at room temperature for a further 5 hours, bringing hydrolysis to completion. To the system were added 150 g of diacetone alcohol, 1 g of aluminum acetylacetonate as a condensation catalyst, and 1 g of polyether-modified silicone as a leveling agent. The mixture was stirred for 30 minutes, obtaining an acrylic functional group-containing silicone solution (L).

To 100 g of the silicone solution were added 50 g of trimethylolpropane triacrylate as a polyfunctional acrylic component, 50 g of propylene glycol monomethyl ether, and 1 g of 2-hydroxy-2-methyl-1-phenylpropan-1-one as a photo-reaction initiator. Stirring yielded a protective layer-forming coating liquid (M) of the UV cure type.

Synthesis Example 11

To 100 g of the acrylic functional group-containing silicone solution (L) were added 80 g of a sol of 30% particles having a primary particle size of 20 nm and consisting of TiO$_2$/ZrO$_2$/SiO$_2$ in a weight ratio of 85/3/12 dispersed in methanol, 10 g of trimethylproppane triacrylate, 1 g of aluminum acetylacetonate as a condensation catalyst, 1 g of polyether-modified silicone as a leveling agent, and 1 g of 2-hydroxy-2-methyl-1-phenylpropan-1-one as a photo-reaction initiator. The mixture was stirred at room temperature. To 100 g of the resulting solution, 500 g of ethanol was added for dilution, yielding a high refractive index layer-forming coating composition (N) of the UV cure type.

Synthesis Example 12

A 1-liter flask equipped with a stirrer, condenser and thermometer was charged with 24.8 g (0.10 mol) of γ-methacryloxypropyltrimethoxysilane and 450 g of isopropanol, to which 300 g of a water-dispersed colloidal silica (active ingredient 20%) was added dropwise. Then 0.1 g of tetramethylammonium hydroxide was added to the mixture, which was heated and stirred at 50° C. for 3 hours. With this method, a silica sol surface treated with methacrylic functional silane was obtained.

To 100 g of the surface treated silica sol were added 40 g of the acrylic functional group-containing silicone solution (L), 40 g of trimethylolpropane triacrylate, 20 g of hexamethylene diol diacrylate, and 1 g of 2-hydroxy-2-methyl-1-phenylpropan-1-one. Stirring yielded a protective layer-forming coating liquid (P) of the UV cure type.

Synthesis Example 13

A 1-liter flask equipped with a stirrer, condenser and thermometer was charged with 330 g of a 2:1 solvent mixture of diacetone alcohol and methyl isobutyl ketone and heated at 80° C. To the solvent being heated and stirred in a nitrogen atmosphere, a mixture of 24.8 g (0.10 mol) of γ-methacryloxypropyltrimethoxysilane, 180 g (1.80 mol) of methyl methacrylate, 14.2 g (0.10 mol) of glycidyl methacrylate, and 2 g of azobisisobutyronitrile was added dropwise over 30 minutes. The mixture was heated at 80° C. and stirred for 5 hours. There was obtained a solution of a hydrolyzable silyl-containing acrylic polymer having a number average molecular weight of 125,000.

Separately, 60 g of 0.1N aqueous acetic acid was added dropwise to a solution of 136 g (1.00 mol) of methyltrimethoxysilane in 72 g of isopropanol at room temperature over 30 minutes. After the completion of dropwise addition, 200 g of the above acrylic polymer solution, 0.1 g of sodium formate as a condensation catalyst, 10 g of acetic acid, and 1 g of polyether-modified silicone as a leveling agent were added to this solution. Stirring yielded a protective layer-forming coating liquid (Q) of the heat cure type having an active component content of 31%.

Synthesis Example 14

As in Synthesis Example 13, a mixture of 24.8 g (0.20 mol) of γ-methacryloxypropyltrimethoxysilane, 160 g (1.60 mol) of methyl methacrylate, 64.6 g (0.10 mol) of 2-(2'-hydroxy-5'-methacryloxyethylphenyl)-2H-benzotriazole, and 2 g of azobisisobutyronitrile was added dropwise to 370 g of the solvent mixture. There was obtained a solution of an acrylic polymer having a number average molecular weight of 103,000.

An adhesion promoter was obtained by subjecting 1.00 mol of γ-aminoethylaminopropyltrimethoxysilane and 2.00 mol of γ-glycidoxypropyldimethoxysilane to ring-opening reaction in the copresence of 3.00 mol of hexamethyldisilazane, and further reacting with 2.00 mol of acetic anhydride. 10 g of a solution of 20% the adhesion promoter in methyl isobutyl ketone was added to 100 g of the acrylic polymer solution, preparing a protective layer-forming coating liquid (R) of the moisture cure type.

Synthesis Example 15

To 100 g of a propylene glycol monomethyl ether acetate solution containing 30% of a polymethyl methacrylate resin having a number average molecular weight of 200,000, 3 g of 2,4-dihydroxybenzophenone was added and 150 g of diacetone alcohol then added. The mixture was stirred until dissolved, preparing a protective layer-forming coating liquid (S) of thermoplastic resin.

Examples are shown below. In these Examples, the following tests were employed for measuring and evaluating physical properties.

Mar Resistance Test

[Test-1]

Using a reciprocal scratch tester (KNT Co., Ltd.) equipped with steel wool #0000, a sample was rubbed back and forth with the wool over ten cycles under a load of 100 g/cm². The number of streaks was counted.

| Rating | Streaks |
|---|---|
| ⊚ | 0 |
| ○ | 1 or 2 |
| Δ | 3 to 5 |
| X | 6 or more |

[Test-2]

In Test-1, flannel fabric was used instead of the steel wool and moved back and forth 1000 cycles under a load of 1 kg. The number of flaws was counted.

| Rating | Flaws |
|---|---|
| ○ | no flaw |
| Δ | hazed |
| X | peeled |

Adhesion of Cured Coat

Measured in accordance with JIS K5400. Using a razor blade, the sample was scored with 11 lines each in the vertical and horizontal directions at 1 mm intervals, thereby forming a grid of 100 square sections. A commercial adhesive tape Celotape® was bonded securely to the scored sample, then rapidly pulled back at an angle of 90 degrees. Some coating sections might be peeled off together. The number of intact sections (X) is reported as X/100.

Refractive Index

The refractive index of a coating was measured by a prism coupler (Seki Technotron Co., Ltd.).

Antireflection

By visual observation, antireflective property was rated as "○" for good and "Δ" for poor.

Chemical Resistance

A droplet of a chemical fluid was dropped or a chemical fluid was applied to a coating, which was allowed to stand for 30 minutes. After the chemical fluid was removed, the surface state was visually inspected. In an alkali resistance test, solutions of two levels, 0.1N (0.4%) NaOH and 1% NaOH aqueous solutions were employed.

| Rating | State |
|---|---|
| ○ | unchanged |
| Δ | marks remained |
| X | coating dissolved away |

Coating Method

The transparent resin substrates used included 0.5 mm thick polycarbonate (PC) and acrylic resin sheets measuring 10×10 cm, and 50 μm thick polyethylene terephthalate (PET) films measuring 10×10 cm. Onto a transparent resin sheet or film whose surface had been cleaned, a coating composition was applied to a predetermined thickness using either a bar coater or by dipping.

When a coating composition solution was applied alone, a cured coat having a thickness of 2 to 3 μm was formed.

When multiple layers were formed, respective coating solutions were applied so as to form a protective layer of 3 to 5 μm thick, a high refractive index layer of 0.1 to 0.3 μm thick, and a low refractive index layer of 0.1 to 0.3 μm thick, all as cured coats.

Curing Conditions

[Heat Curing]

The solution was applied, after which the coating was air dried to evaporate off the solvent, then held in a hot air circulation oven at 80 to 120° C. for 5 to 30 minutes to effect curing.

[UV Curing]

The coating was cured by exposing it three times to a dose of 200 mJ/cm² with a high-pressure mercury vapor lamp. In the event multiple layers were formed, the underlying layer was cured before the overlying layer was coated and cured.

Examples 1-3

On an acrylic resin sheet and a PC sheet, each of the coating composition liquids N and Q was applied and cured to form a protective layer. On this cured coat, each of the coating solutions I, II and III was applied and cured to form an antireflective coating. The properties of these coated sheets were examined by the aforementioned tests. The results are shown in Table 1.

TABLE 1

|  |  | Example | | |
|---|---|---|---|---|
|  |  | 1 | 2 | 3 |
| Substrate |  | acrylic | acrylic | PC |
| Protective coating composition |  | N | Q | N |
| Antireflective coating solution |  | I | II | III |
| Mar resistance | Test-1 | ⊚ | ⊚ | ⊚ |
|  | Test-2 | ○ | ○ | ○ |
| Adhesion (X/100) |  | 100/100 | 100/100 | 100/100 |
| Chemical resistance | 1% NaOH | ○ | ○ | ○ |
|  | Mypet[1] | ○ | ○ | ○ |
|  | Nivea[2] | ○ | ○ | ○ |
|  | Magiclean[3] | ○ | ○ | ○ |
|  | Ethanol | ○ | ○ | ○ |
| Refractive index of coat |  | 1.392 | 1.388 | 1.385 |

[1] Mypet, household detergent by Kao Co., Ltd.
[2] Nivea, skin care creme by Kao Co., Ltd.
[3] Magiclean, household detergent by Johnson Co., Ltd.

It is seen from Table 1 that the antireflective coatings obtained from the protective layer-forming coating compositions within the scope of the invention exhibit 10 excellent mar resistance and chemical resistance and have a refractive index of less than 1.400.

Examples 4-8 and Comparative Examples 1-3

On PET films, protective layer-forming coating composition liquids, high refractive index layer-forming coating composition liquids, antireflective coat-forming coating composition solutions were successively applied and cured to form multilayer laminates. The coat properties of these laminates were examined by the aforementioned tests. The results are shown in Table 2.

TABLE 2

|  |  | Example | | | | | Comparative Example | | |
|---|---|---|---|---|---|---|---|---|---|
|  |  | 4 | 5 | 6 | 7 | 8 | 1 | 2 | 3 |
| Protective layer |  | M | P | Q | R | S | M | M | M |
| High refractive index layer |  | K | N | K | N | K | K | N | K |
| Antireflective coating |  | I | II | III | IV | V | VI | VII | VIII |
| Mar resistance | Test-1 | ⊚ | ⊚ | ⊚ | ⊚ | ⊚ | ⊚ | ⊚ | X |
|  | Test-2 | ○ | ○ | ○ | ○ | ⊚ | ○ | ○ | Δ |
| Adhesion (X/100) |  | 100 | 100 | 100 | 100 | 100 | 100 | 100 | 90 |
| Chemical resistance | 0.1N NaOH[4] | ○ | ○ | ○ | ○ | ○ | X | Δ | ○ |
|  | 1% NaOH | ○ | ○ | ○ | ○ | ○ | X | X | ○ |
|  | Mypet | ○ | ○ | ○ | ○ | ○ | Δ | ○ | Δ |
|  | Nivea | ○ | ○ | ○ | ○ | ○ | ○ | ○ | Δ |
|  | Magiclean | ○ | ○ | ○ | ○ | ○ | ○ | ○ | Δ |
|  | Ethanol | ○ | ○ | ○ | ○ | ○ | ○ | ○ | Δ |
| Antireflection |  | ○ | ○ | ○ | ○ | ○ | Δ | Δ | ○ |

[4] 0.1N NaOH = 0.4 wt % NaOH aqueous solution

It is seen from Table 2 that the coats obtained from the antireflective coating compositions within the scope of the invention exhibit excellent mar resistance, chemical resistance and antireflection.

Japanese Patent Application No. 2004-298523 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An antireflective coating exhibiting improved alkali resistance, wherein said antireflective coating comprises:

(1) a three-dimensional crosslinked structure containing fluorine atoms and silicon atoms, said three-dimensional crosslinked structure comprising Si—O—Si linkages and Si—$C_2H_4$—$(CF_2)_n$—$C_2H_4$—Si linkages, wherein n is equal to 4 or 6;

(2) perfluoroalkyl groups having the following structure:

—$C_2H_4$—$(CF_2)_a$F wherein a is equal to 4, 6, 8, 10 or 12, and said perfluoroalkyl groups account for 90 to 100 mol % of all monovalent organic substituent groups attached to said silicon atoms of said three-dimensional crosslinked structure; and (3) a single end-capped diorganopolysiloxane chain containing silicon atoms, wherein a molar ratio of the total number of fluorine atoms to the total number of silicon atoms within the antireflective coating is from 8.0 to 10.0, whereby said antireflective coating is formed as an outermost layer on a transparent synthetic resinous substrate.

2. The antireflective coating of claim 1 which contains only 0 to less than 1 mol % based on the entire silicon atoms of $SiZ_4$ units wherein Z is an OH group, alkoxy group of 1 to 4 carbon atoms, acyloxy group, alkenoxy group or siloxane residue.

3. A coating composition for forming an antireflective coating having improved alkali resistance, comprising primarily a mixture of:

(1) a bis-silane compound having the formula (A):

$$X_mR_{3-m}Si—C_2H_4(CF_2)_nC_2H_4—SiR_{3-m}X_m \quad (A)$$

wherein R which may be the same or different is a monovalent hydrocarbon group selected from alkyl groups of 1 to 6 carbon atoms and phenyl groups, X is an OH group, halogen atom, alkoxy group of 1 to 4 carbon atoms, acyloxy group, alkenoxy group, ketoxime group, alkoxyalkoxy group or —NCO group, m is 2 or 3, and n is 4 or 6, and/or a (partial) hydrolyzate and/or condensate thereof;

(2) a perfluoroalkyl-containing organosilicon compound having the formula (B):

$F(CF_2)_a C_2H_4—SiR_{3-b}X_b$     (B)

wherein R and X are as defined above, a is 4, 6, 8, 10 or 12, and b is 2 or 3, and/or a (partial) hydrolyzate and/or condensate thereof, or a (partial) cohydrolytic condensate of a mixture of components (1) and (2), wherein the content of component (2) is 42 to 70% by weight based on the total weight of components (1) and (2); and (3) an organosilicon compound having the average compositional formula (C):

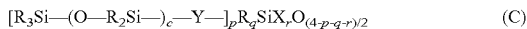
$[R_3Si—(O—R_2Si—)_c—Y—]_p R_q SiX_r O_{(4-p-q-r)/2}$     (C)

wherein R and X are as defined above, Y is —O— or an alkylene group of 2 to 10 carbon atoms, p, q, and r are numbers satisfying $0.01 \leq p < 1$, $0 \leq q < 1$, $0.5 \leq r < 3$, $1 < p+q+r < 4$, and c is a number of 1 to 100.

4. The coating composition of claim 3, further comprising a silicon or fluorine-containing surfactant.

5. The coating composition of claim 3 wherein the mixture of organosilicon compounds (1) and (2) or the (partial) cohydrolytic condensate thereof contains only less than 1% by weight of an alkyl silicate, epoxy-functional silane, (meth)acrylic-functional silane, mercapto-functional silane, amino-functional silane and (partial) hydrolyzates thereof.

6. The coating composition of claim 3, further comprising 50 to 99% by weight based on the composition of a solvent.

7. A coated optical article comprising a transparent substrate of synthetic resin and a cured coating of the coating composition of claim 3 formed on the substrate as an outermost layer, said cured coating serving as an antireflective coating.

8. The coated optical article of claim 7, further comprising a coating having a higher refractive index than the substrate and/or a protective layer having mar resistance disposed between the transparent substrate and the antireflective coating.

9. The coated optical article of claim 8 wherein said coating having a higher refractive index comprises a metal oxide sol containing at least one element selected from Ti, Sn, Ce, Al, Zr, In, and Fe.

10. The coated optical article of claim 7 wherein said synthetic resin is selected from the group consisting of polycarbonate resins, polyalkylene terephthalate resins, acrylic resins, triacetyl cellulose resins, polystyrene resins, and polyolefin resins.

11. The coated optical article of claim 7 wherein said transparent substrate is in the form of film or plate.

12. A multilayer laminate comprising the coated optical article of claim 7, a layer of adhesive or pressure-sensitive adhesive disposed on the side of the transparent substrate remote from the antireflective coating, and a peelable coating disposed thereon.

\* \* \* \* \*